United States Patent
Oku et al.

(10) Patent No.: US 6,527,832 B2
(45) Date of Patent: Mar. 4, 2003

(54) DEVICE FOR RECOVERY OF HYDROGEN

(75) Inventors: Manabu Oku, Shin-Nanyo (JP);
Kouichi Kawatani, Tokyo (JP);
Takeshi Utsunomiya, Tokyo (JP);
Tsutomu Seki, Tokyo (JP)

(73) Assignees: Nisshin Steel Co., Ltd. (JP); Tokyo Gas Co., Ltd. (JP)

( * ) Notice: Subject to any disclaimer, the term of this patent is extended or adjusted under 35 U.S.C. 154(b) by 0 days.

(21) Appl. No.: 09/891,231

(22) Filed: Jun. 25, 2001

(65) Prior Publication Data

US 2002/0011152 A1 Jan. 31, 2002

(30) Foreign Application Priority Data

Jun. 27, 2000 (JP) .................................. 2000-192048
Jun. 27, 2000 (JP) .................................. 2000-192049

(51) Int. Cl.[7] .............................................. B01D 53/22
(52) U.S. Cl. ........................... 96/4; 95/56; 96/10; 96/11
(58) Field of Search ...................... 55/524, 16.5; 95/45, 95/55, 56; 96/4, 7, 10, 11

(56) References Cited

U.S. PATENT DOCUMENTS

| | | | | | |
|---|---|---|---|---|---|
| 2,824,620 | A | * | 2/1958 | De Rosset | 95/56 |
| 3,148,031 | A | * | 9/1964 | Vahldieck et al. | 95/56 |
| 3,203,086 | A | * | 8/1965 | Eyraud et al. | 96/10 X |
| 3,238,704 | A | * | 3/1966 | Straschil et al. | 96/11 |
| 3,336,730 | A | * | 8/1967 | McBride et al. | 95/56 |
| 3,447,288 | A | * | 6/1969 | Juda et al. | 96/11 |
| 3,469,372 | A | * | 9/1969 | Yamauchi et al. | 96/11 |
| 5,225,080 | A | * | 7/1993 | Karbachsch et al. | 96/4 X |
| 5,259,870 | A | * | 11/1993 | Edlund | 95/56 |
| 5,453,298 | A | * | 9/1995 | Gavalas et al. | 95/55 X |
| 5,498,278 | A | * | 3/1996 | Edlund | 95/56 X |
| 5,782,960 | A | * | 7/1998 | Ogawa et al. | 95/56 X |
| 5,997,594 | A | * | 12/1999 | Edlund et al. | 96/11 X |
| 6,221,117 | B1 | * | 4/2001 | Edlund et al. | 95/56 X |

FOREIGN PATENT DOCUMENTS

| | | | | |
|---|---|---|---|---|
| JP | 61-278328 | A | * 12/1986 | ............ 96/11 |
| JP | 62102814 | A | * 5/1987 | ............ 96/11 |
| JP | 63-258619 | A | * 10/1988 | ............ 95/45 |
| JP | 63294925 | | 12/1988 | ...... B01D/53/22 |
| JP | 01164419 | | 6/1989 | ...... B01D/53/22 |

OTHER PUBLICATIONS

US 6,340,380, 1/2002, Frost et al. (withdrawn)*

* cited by examiner

*Primary Examiner*—Robert H. Spitzer
(74) *Attorney, Agent, or Firm*—Webb Ziesenhiem Logsdon Orkin & Hanson P.C.

(57) ABSTRACT

The new hydrogen-recovering device 10 has a box-shaped frame 11 made of stainless steel having a takeout pipe 12 attached to its one side. A plurality of spacers 13 are arranged inside the box-shaped frame 11 along a lengthwise direction of the device 10. A perforated metal plate 14 is fixed to each surface of the box-shaped frame 11, and a hydrogen-permeating membrane 16 cladded with a membrane holder 15 is further fixed to the perforated metal plate 14. Hydrogen gas as a decomposition product of hydrocarbon selectively passes through the hydrogen-permeating membrane 16 and flows through the takeout pipe 12 to the outside. A tubular device, which has the structure that a hydrogen-permeable membrane is fixed to a perforated metal plate wound around a tubular frame, is also proposed. The device 10 is light and strong, so that it is installed in a gas-reforming plant without use of a fixing jig.

4 Claims, 4 Drawing Sheets

DEVICE FOR RECOVERY OF HYDROGEN

BACKGROUND OF THE INVENTION

Field of the Invention

The present invention relates to a device for recovering hydrogen generated by decomposition of hydrocarbon gas with steam.

Hydrogen has been used in broad industrial fields as basic raw material in a chemical industry, a fuel for a fuel cell or an atmospheric gas for heat treatment. A representative process to cope with a small demand is decomposition of hydrocarbon gas with steam. A decomposition product contains CO, $CO_2$ and residual $H_2O$ other than $H_2$. The product cannot be used as such for a fuel cell due to the inclusions; otherwise faculty of the fuel cell would be degraded. In this regard, it is necessary to remove subspecies such as CO, $CO_2$ and residual $H_2O$, before the reformed product is supplied to a fuel cell.

A conventional method of removing subspecies uses a hydrogen-permeating membrane made of such a catalytic element as Pd—Ag or Ta selectively permeable to hydrogen. The hydrogen-permeating membrane has been formed so far as a thin layer on a heat-resistant perforated body, as disclosed in JP 63-294925 A1 and JP 1-164419 A1. Recently, feasibility of a perforated metal body, in which a plurality of holes are formed for passage of hydrogen has been studied instead of a conventional heat-resistant perforated body.

A perforated metal body coated with a hydrogen-permeating membrane is attached to a surface of a hydrogen-recovering device, to which a takeout pipe is coupled, and embedded in a catalyst layer. Hydrogen gas generated by decomposition of hydrocarbon gas with steam selectively passes through the hydrogen-permeating membrane into the hydrogen-recovering device and flows through the takeout pipe to the outside.

A conventional hydrogen-recovering device uses a thick plate as a structural member in order to inhibit thermal deformation caused by heat cycles between high and ordinary temperatures. As a result, the device is heavy, and a special fixing jig is necessarily used for fixing the device in a reforming plant at a predetermined position. The thick plate is processed by etching, machining or electric discharge machining to form holes for passage of hydrogen and a header, and then a hydrogen-permeating membrane such as a Pd—Ag alloy is laser-welded to an external surface of the thick plate. Such processing is troublesome and inappropriate for mass-production at a low cost.

SUMMARY OF THE INVENTION

The present invention aims at provision of a new hydrogen-recovering device, which is light and strong, easy to manufacture by using a thin steel sheet press-worked to a predetermined shape as a structural member.

The present invention proposed a box-shaped or tubular hydrogen-recovering device having a frame made of a ferritic stainless steel.

The box-shaped hydrogen-recovering device has a box-shaped frame made of a ferric stainless steel having a takeout pipe attached to its one side, a plurality of spacers arranged along a lengthwise direction inside said box-shaped frame, perforated metal plates fixed to both surfaces of said box-shaped frame, a hydrogen-permeating membrane clad with a membrane holder fixed to said perforated metal plate, wherein hydrogen gas as a decomposition product of hydrocarbon selectively passes through said hydrogen-permeating membrane and flows to the outside.

The tubular hydrogen-recovering device comprises a pair of upper and lower discs each of which has an opening for passage of hydrogen at its center, a plurality of reinforcement members which extend between said upper and lower discs and locate with the same intervals along a circumferential direction, perforated metal plates which is fixed to a cylindrical surface defined by curved surfaces and end faces of said reinforcement members and is coated with a hydrogen-permeating membrane, and a takeout pipe coupled to one or both of said upper and lower discs, wherein hydrogen passes through said hydrogen-permeating membrane into a cavity inside said perforated plates and flows through said takeout pipe to the outside.

The members other than the hydrogen-permeating membrane are preferable made of a ferritic stainless steel which has a thermal expansion coefficient near that of the hydrogen-permeating membrane.

DETAILED DESCRIPTION OF THE PREFERRED EMBODIMENTS

Figure 1:
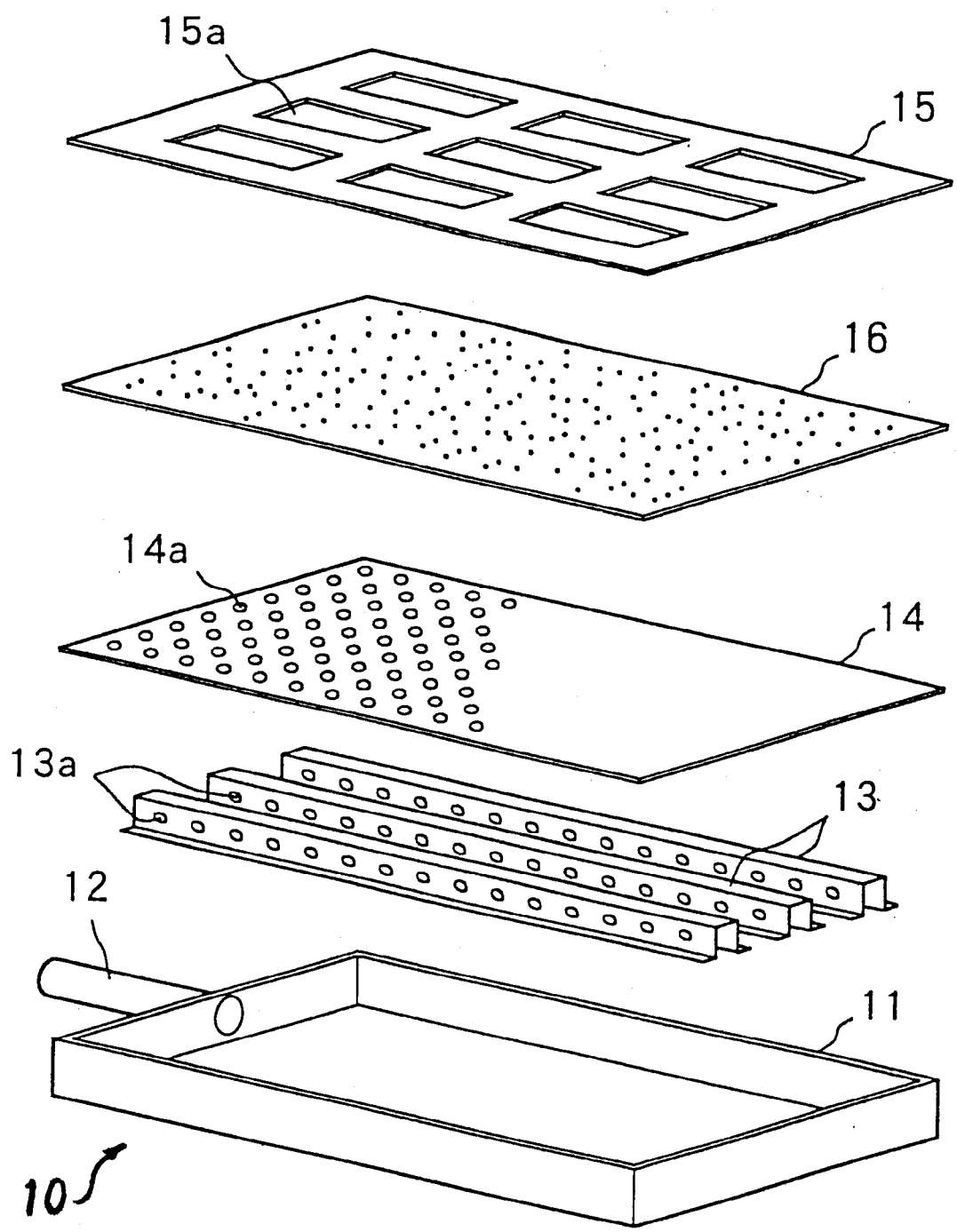
FIG. 1 is a bird eye's view for explaining fabrication of a box-shaped hydrogen-recovering device.

A box-shaped hydrogen-recovering device 10 has a box-shaped frame 11, as shown in FIG. 1. The frame 11 is fabricated from a stainless steel sheet pressed to a predetermined rectangular shape by welding, as a structural member. The box-shaped frame may be a unitary body as shown in FIG. 1 or a body separable to upper and lower parts at a position of a takeout pipe 12.

The takeout pipe 12 for outflow of hydrogen gas is fixed to one side of the frame 11, a plurality of spacers 13 are arranged inside the frame 11, and a perforated metal plate 14 is put on and fixed to the frame 11. A hydrogen separator having a hydrogen-permeating membrane 16 clad with a membrane holder 15 is further fixed to the perforated metal plate 14. Another hydrogen separator is attached to an opposite surface of the frame 11 in the same way.

The hydrogen-permeating membrane 16 is a thin film of 5–50 $\mu$m in thickness made of a Pd-20%Ag alloy or Ta selectively permeable to hydrogen. The membrane holder 15 as a reinforcement for the membrane 16 is a stainless steel sheet having many openings 15a formed therein. The hydrogen-permeating membrane 16 may be fixed to the membrane holder 15 by $CO_2$ laser-welding, YAG laser-welding, microwave plasma-welding, electron beam-welding or the like.

A lot of small openings 14a are formed in the metal plate 14, to introduce hydrogen gas, which passes through the hydrogen-permeating membrane 16, to an inner space of the hydrogen-recovering device 10. The small openings 14a are preferably of 0.1–1.5 mm in diameter so as to avoid lead-in of the hydrogen-permeating membrane 16 inside the device 10 without increase of resistance against flow of hydrogen gas. The small openings 14a are preferably formed in the metal plate 14 at an area ratio of 10% or more based on a surface of the hydrogen-permeating membrane 16, in order to effectively absorb hydrogen gas, which is generated by decomposition of hydrocarbon gas with steam, in the device 10. The small openings 14a of such diameter may be formed by electron beam-machine or chemical etching. Of course, a metal sheet having openings of predetermined diameter formed by punching can be used as the perforated metal plate 14.

The spacers 13 are arranged inside the box-shaped frame 11 along a lengthwise direction of the device 10. The spacers 13 support the hydrogen-permeating membrane 16 and also define a passage of hydrogen gas, which is absorbed in the device 10, leading to the takeout pipe 12. The spacers 13 are made from a stainless steel sheet shaped to a C-shaped cross section. A plurality of holes 13a for passage of hydrogen gas are formed at side faces of the spacers 13.

The hydrogen-permeating membrane 16 is firmly fixed to the box-shaped frame 11 in a state reinforced with the membrane holder 15, the perforated metal plate 14 and the spacers 13. Due to such supporting members, the hydrogen-permeating membrane 16 sufficiently resists to deformation or damage caused by thermal stress, when the hydrogen-recovering device 10 is installed in a gas-reforming plant exposed to heat cycles of heating and cooling. Therefore, the membrane 16 maintains its selective hydrogen-permeability at a high level over a long term.

Figure 2A:
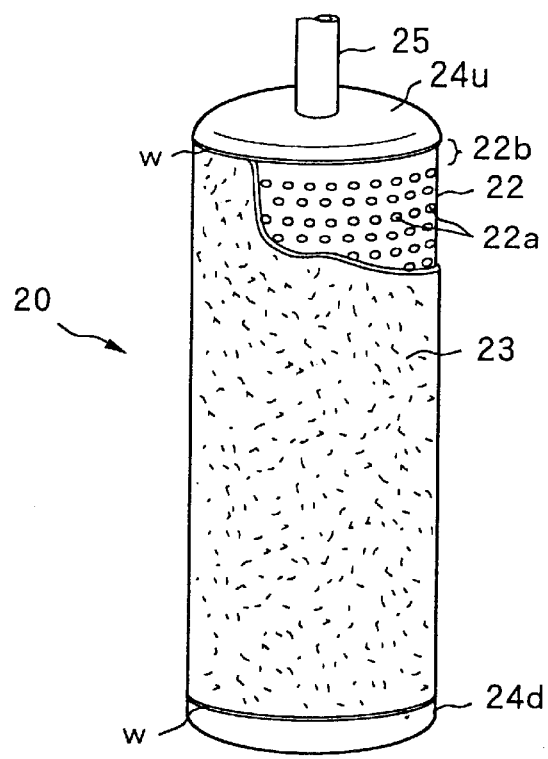
FIG. 2A is a bird eye's view (a) illustrating a tubular hydrogen-recovering device.
Figure 2B:
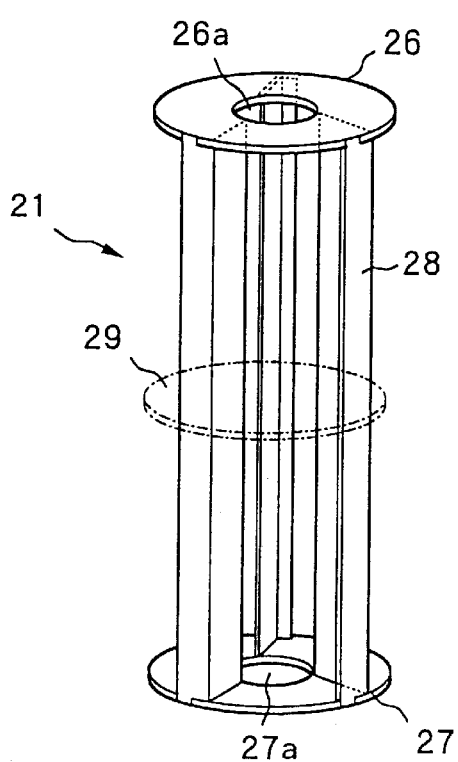
FIG. 2B is a bird eye's view illustrating the tubular frame.
Figure 2C:
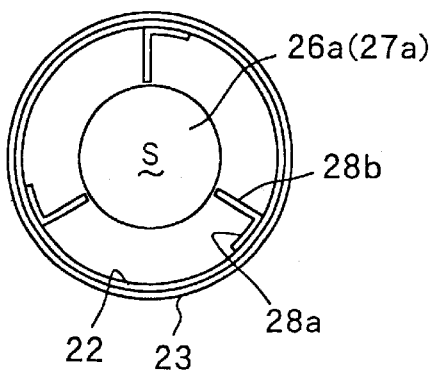
FIG. 2C is a horizontal sectional view illustrating the tubular hydrogen-recovering device.

A tubular hydrogen-recovering device 20 has a tubular frame 21, as shown in FIG. 2B. which is fabricated by press-working and welding a stainless steel sheet, as a structural member. A perforated plate metal 22, on which a hydrogen-permeating membrane 23 is laminated, is wound around the tubular frame 21. Caps 24u and 24d are attached to a top and a bottom of the tubular frame 21. A takeout pipe 25 is coupled to the upper cap 24u, to take out hydrogen gas, which passes through the hydrogen-permeating membrane 23 into the device 20. The takeout pipe 25 may be coupled to the lower cap 24d or to both of the caps 24u and 24d.

The hydrogen-permeating membrane 23 is the same film as the hydrogen-permeating membrane 16 shown in FIG. 1. The perforated metal plate 22 is made of stainless steel or the like excellent in heat resistance for reinforcement of the hydrogen-permeating membrane 23. The perforated metal plate 22 made of stainless steel has nearly the same thermal expansion coefficient as that of the hydrogen-permeating membrane 23, so that the hydrogen-permeating membrane 23 is prevented from peeling-off caused by heat cycles of heating and cooling.

The metal plate 22 has small openings 22a for introducing hydrogen, which passes through the hydrogen-permeating membrane 23, into the device 20. The small openings 22a are preferably of 0.1–1.5 mm in diameter so as to avoid lead-in of the hydrogen-permeating membrane 23 inside the hydrogen-recovering device 20 without increase of resistance against flow of hydrogen gas. The small openings 22a are preferably formed in the metal plate 22 at an area ratio of 10% or more based on a surface of the hydrogen-permeating membrane 23. The small openings 22a of such diameter may be formed by electron beam-machining or chemical etching. Of course, a metal sheet having openings of predetermined diameter formed by punching can be used as the perforated metal plate 22.

The tubular frame 21 has an upper disc 26 and a lower disc 27, between which a plurality of reinforcement members 28 are extended, as shown in FIG. 2B. The upper disc 26, the lower disc 27 and the reinforcement members 28 are preferably made of a stainless steel good of heat resistance and high-temperature strength.

Figure 2D:
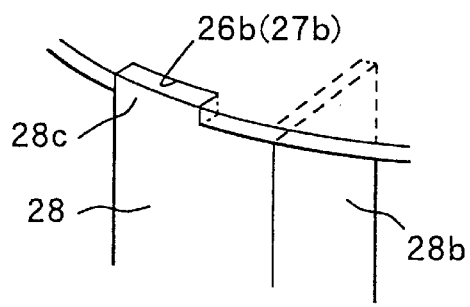
FIG. 2D is a partial view for explaining joining a reinforcement member to an upper or lower disc.

Openings 26a and 27a for passage of hydrogen are formed in the upper disc 26 and the lower disc 27, respectively, at their centers. Notched parts 26b and 27b for insertion of top and bottom ends of the reinforcement members 28 are formed with the same intervals along the circumferences of the upper disc 26 and the lower disc 27, respectively, as shown in FIG. 2D. Each reinforcement member 28 has a curved part 28a matching to a periphery of the upper disc 26 or the lower disc 27 and an inward part 28b bent with a right angle from the curved part 28a. That is, the reinforcement member 28 has an L-shaped cross section composed of the curved part 28a and the inward part 28b, so as to enhance its deformation resistance along a circumferential direction. The curved part 28a and the inward part 28b are partially cut off with a length corresponding to thickness of the discs 26 and 27 at the top and the bottom of the reinforcement member 28, to form projections 28c.

When the projections 28c are inserted into the notched parts 26b, 27b of the discs 26 and 27, the inward parts 28b direct to a center of the tubular frame 21, and the curved parts 28a compose parts of the cylindrical surface. Since a plurality of the reinforcement members 28 are installed between the upper disc 26 and the lower disc 27 with the same intervals along the circumferential direction, the tubular frame 21 is fabricated in a state good of strength and sufficiently resistant to deformation caused by vertical and circumferential stresses. In case of a long tubular frame 21, one or more intermediate discs 29 (shown in FIG. 2B) having the same configuration as the discs 26, 27 may be interposed between the upper disc 26 and the lower disc 27, in order to surely protect the reinforcement members 28 from deformation for maintenance of a predetermined space for passage of hydrogen gas.

An upper cap 24u and a lower cap 24d, to which a takeout pipe 25 is coupled are attached to the tubular frame 21.

Thereafter, a perforated metal plate 22, on which the hydrogen-permeating membrane 23 is laminated, is fixed to a cylindrical surface defined by the curved parts 28a of the reinforcement members 28. The perforated metal plate 22 is seam-welded to the caps 24u and 24d at positions w. The perforated metal plate 22 may be optionally spot-welded to the curved parts 28a of the reinforcement members 28, the upper disc 26 and the lower disc 27. Accounting welding operation, the perforated metal plate 22 has preferably upper and lower parts 22b without the small openings 22a The hydrogen-recovering device 20 fabricated in this way is light and strong. Since the device 20 is reinforced with a plurality of the members 28, a space S for passage of hydrogen gas is assured inside the device 20. The perforated metal plate 22 is supported by the reinforcement members 28 from the inside. Therefore, the device 20 exhibits excellent deformation resistance against thermal stress and maintains selective hydrogen-permeability at a high level without deformation or damage, when it is installed in a gas-reforming plant driven with heat cycles of heating and cooling.

Figure 3A:
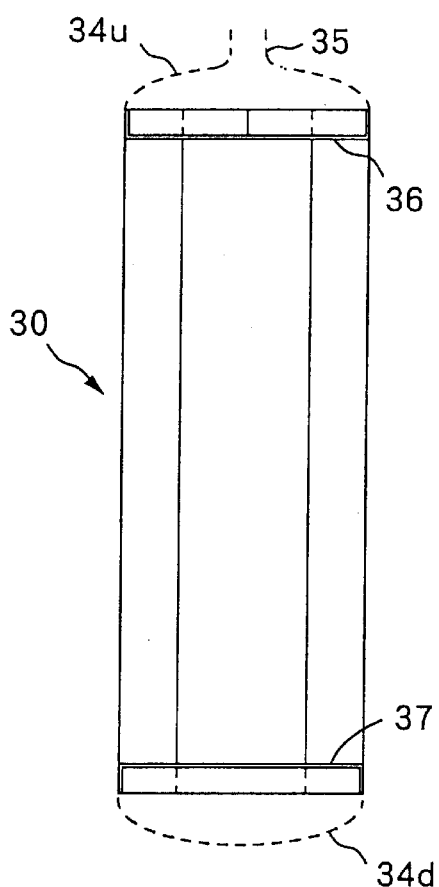
FIG. 3A is a sectional view illustrating another tubular hydrogen-recovering device.
Figure 3B:
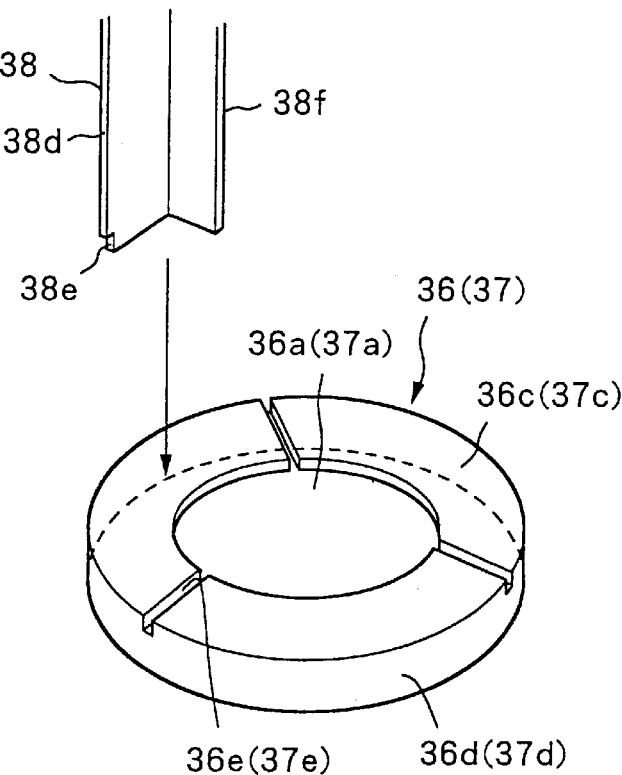
FIG. 3B is a partial view for joining a reinforcement member to an upper or lower disc.
Figure 3C:
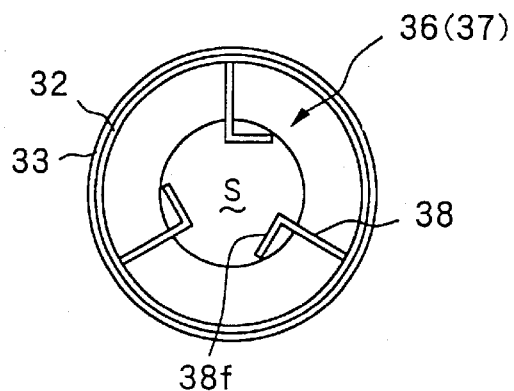
FIG. 3C is a horizontal sectional view illustrating the tubular hydrogen-recovering device.

A perforated metal plate 32 may be supported by sides of reinforcement members 38, as shown in FIG. 3C. In this case, a plurality of the reinforcement members 38 extend between an upper disc 36 and a lower disc 37, in the manner such that a side face 38d of each reinforcement member 38 locates at peripheries of the discs 36 and 37.

Each of the upper disc 36 and the lower disc 37 has the configuration that a flange 36d, 37d stands up on a bottom 36c, 37c at its periphery. An opening 36a, 37a for passage of hydrogen gas is formed in the bottom 36c, 37c at its center, as shown in FIG. 3B. Notched parts 36e, 37e, which extend from the periphery of the bottom 36c, 37c to the opening 36e, 37e, are formed in the bottom 36c, 37c. An L-shaped reinforcement member 38 has top and bottom ends inserted into the notched parts 36e, 37e. The side face 38d of the reinforcement member 38 is preferably stepped at its upper and lower parts 38e, to facilitate positioning of the reinforcement member 38 to the upper disc 36 and the lower disc 37.

The hydrogen-recovering device 30 shown in FIG. 3A has the structure that perforated metal plates 32, on which the hydrogen-permeating membrane 33 is laminated, is supported with the side faces 38d of the reinforcement members 38. Such structure enables decrease of the small openings 32a in number plugged with the reinforcement members 38 and so broadens an effective surface area of the hydrogen-permeating membrane 33. The reinforcement member 38 is also improved in rigidity due to the bent part 38f. Therefore, when the device 30 installed in a gas-reforming plant is exposed to heat cycles if heating and cooling during recovery of hydrogen gas, the perforated metal plate 32 is prevented from deformation or damage so as to assure a predetermined space S for passage of hydrogen gas, as shown in FIG. 3C. FIG. 3A also illustrates caps 34d and 24u and a take out pipe 35.

Figure 4:
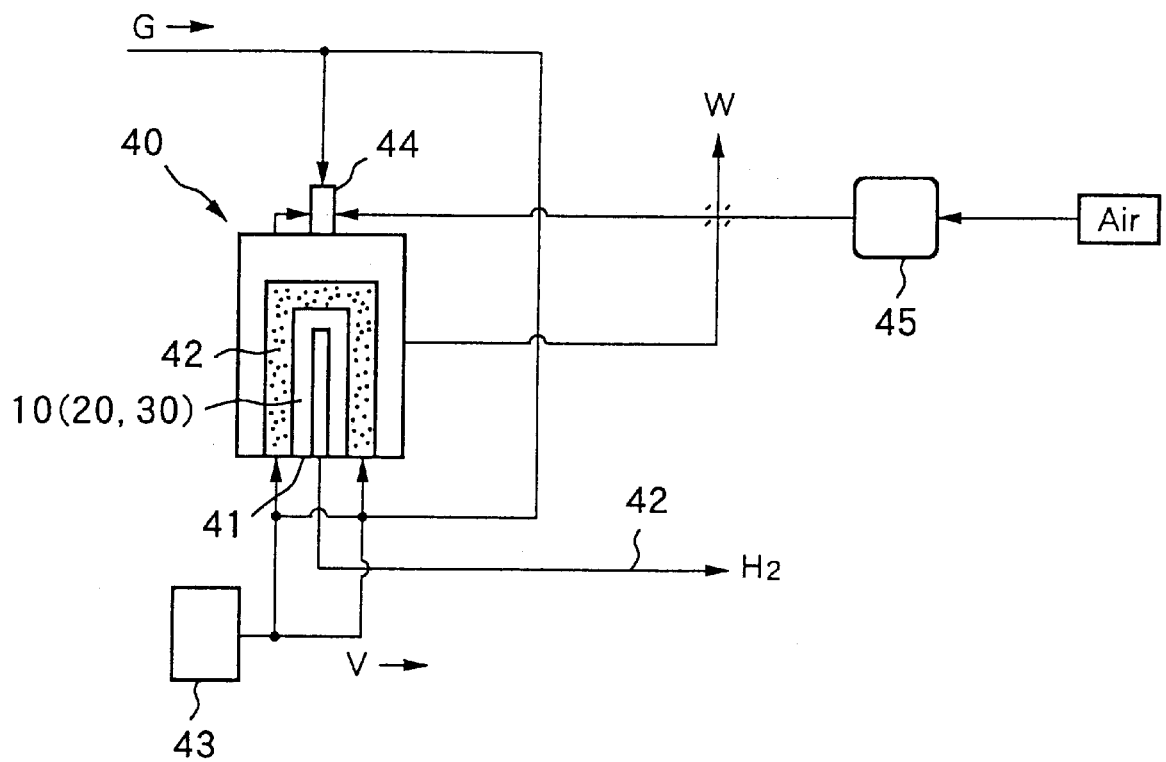
FIG. 4 is a schematic view illustrating a gas-reforming plant.

Any of the hydrogen-recovering devices 10, 20 and 30 is light and strong, so that it can be installed in a gas-reforming plant 40 without use of such a fixing jig as in case of a conventional hydrogen-recovering device, as shown in FIG. 4. The takeout pipe 12 is coupled to an opening 41 of the gas-reforming plant 40. After installation of the hydrogen-recovering device 10 (20 or 30), a cavity of the gas-reforming plant 40 is filled with a reforming catalyst 42 such as a Ni catalyst supported with alumina. Omission of any fixing jig for installation of the hydrogen-recovering device 10 (20 or 30) means that a ratio of an inner space of the gas-reforming plant 40 occupied by the device 10 (20 or 30) is made smaller, so that a big amount of the catalyst 42 can be put in the gas-reforming plant 40 to enhance an efficiency of hydrocarbon-decomposing reaction.

Hydrocarbon gas G such as city gas is fed together with steam V generated by a boiler 43 into the gas-reforming plant 40 receiving the hydrogen-recovering device 10 (20 or 30) and the catalyst 42 therein. When the gas-reforming plant 40 is heated with a burner 44 to which compressed air is supplied from a compressor 45, the hydrocarbon gas G is decomposed to $H_2$ and $CO_2$ according to a reforming reaction of $CH_4+2H_2O=4H_2+CO_2$. $H_2$ as a decomposition product selectively passes through the hydrogen-permeating membrane 16 (23) into the hydrogen-recovering device 10 (20 or 30), and flows out through the takeout pipe 44. Waste gas W other than $H_2$ is discharged through an exhaust pipe to the outside.

Since hydrogen is separated from the reacting zone, equilibrium in the reaction of $CH_4+2H_2O=4H_2+CO_2$ is destroyed, and the reaction is promoted to the rightwards. Consequently, hydrogen is produced with sufficient reaction efficiency even at a relatively lower temperature of 500–550° C.

An atmospheric pressure in the hydrogen-recovering device 10 (20 or 30) is preferably controlled at a value lower by 0.1–1 MPa than that of the gas-reforming plant 40, in order to effectively introduce hydrogen gas as a decomposition product into the hydrogen-recovering device 10 (20 or 30). That is, an inner space of the hydrogen-recovering device 10 (20 or 30) is preferably held in a decompressed state, to increase a flow amount of hydrogen gas selectively passing through the hydrogen-permeating membrane 16 (23) for further acceleration of the hydrocarbon-decomposing reaction.

The hydrogen-recovering device 10 (20 or 30) is prevented from deformation regardless of the application of the pressure difference, since the hydrogen-permeating membrane 16 (23) is supported with the membrane holder 15, the perforated metal plate 14 and the spacers 13 or with the reinforcement members 23 (38).

The box-shaped hydrogen-recovering device newly proposed by the present invention has the structure that a hydrogen-permeating membrane clad with a membrane holder and fixed to spacers and a perforated metal plate of a box-shaped frame. The tubular hydrogen-recovering device has the structure that a hydrogen-permeating membrane is supported with a perforated metal plate. Due to the structure, any of the devices is light and strong, so that it can be installed in a gas-reforming plant without use of a fixing jig. Omission of a fixing jig means that a ratio of an inner space of the gas-reforming plant occupied by the device is made smaller, so that a big amount of a catalyst can be put in the gas-reforming plant to enhance an efficiency of a reforming reaction. The device also maintains its original shape without deformation, even when its internal pressure is differentiated from a pressure of the gas-reforming plant to promote outflow of hydrogen gas.

What is claimed is:

1. A box-shaped device for recovery of hydrogen gas generated by decomposition of hydrocarbon, which comprises:

a box-shaped frame made of stainless steel having a takeout pipe attached to its one side;

a plurality of spacers arranged along a lengthwise direction inside said box-shaped frame;

perforated metal plates fixed to both surfaces of said box-shaped frame;

a hydrogen-permeating membrane clad with a membrane holder fixed to each of said perforated metal plates, wherein hydrogen gas selectively passes through said hydrogen-permeating membrane and flows through said takeout pipe to the outside.

2. The box-shaped device defined in claim 1, wherein the spacers and the perforated metal plate are made of stainless steel.

3. A tubular device for recovery of hydrogen gas generated by decomposition of hydrocarbon, which comprises:

a pair of upper and lower discs each of which has an opening for passage of hydrogen at its center;

a plurality of reinforcement members, which extend between said upper and lower discs and locate with the same intervals along a circumferential direction;

perforated metal plates, each of which is fixed to a cylindrical surface defined by curved surfaces and end faces of said reinforcement members and is coated with a hydrogen-permeating membrane; and a takeout pipe coupled to one or both of said upper and lower discs;

wherein hydrogen selectively passes through said hydrogen-permeating membrane into a cavity inside said perforated plates and flows through said takeout pipe to the outside.

4. The tubular device defined in claim 3, wherein the upper and lower discs, the reinforcement members and the perforated plates are made of ferritic stainless steel.

* * * * *